United States Patent
Gunasekara et al.

(10) Patent No.: US 8,009,613 B1
(45) Date of Patent: Aug. 30, 2011

(54) SYSTEMS AND METHOD OF COUPLING A WIRELESS MACRO NETWORK TO A WIRELESS ADAPTER

(75) Inventors: Don Gunasekara, Reston, VA (US); Sunil Prasad, Ashburn, VA (US)

(73) Assignee: Nextel Communications Inc., Reston, VA (US)

( * ) Notice: Subject to any disclaimer, the term of this patent is extended or adjusted under 35 U.S.C. 154(b) by 961 days.

(21) Appl. No.: 11/846,572

(22) Filed: Aug. 29, 2007

(51) Int. Cl.
 *H04W 4/00* (2009.01)
(52) U.S. Cl. ......... 370/328; 370/334; 370/338; 370/465
(58) Field of Classification Search .................. 370/328, 370/332, 334, 335, 343, 395.21, 401, 490, 370/329, 338, 389, 465; 455/403, 557
See application file for complete search history.

(56) References Cited

U.S. PATENT DOCUMENTS

| | | | |
|---|---|---|---|
| 6,725,031 B2* | 4/2004 | Watler et al. | 455/405 |
| 7,269,403 B1* | 9/2007 | Miao | 455/402 |
| 7,486,648 B1* | 2/2009 | Baranowski | 370/338 |
| 7,508,834 B2* | 3/2009 | Berkman et al. | 370/401 |
| 7,596,693 B1* | 9/2009 | Caves et al. | 713/161 |
| 7,720,056 B1* | 5/2010 | Lohtia et al. | 370/389 |
| 2005/0025188 A1* | 2/2005 | Numakura et al. | 370/490 |
| 2006/0097573 A1* | 5/2006 | Gidge et al. | 307/3 |
| 2008/0039015 A1* | 2/2008 | Nakata et al. | 455/39 |
| 2009/0016279 A1* | 1/2009 | Beser | 370/329 |

OTHER PUBLICATIONS

U.S. Appl. No. 11/689,808, filed Mar. 22, 2007, Dianda et al.
U.S. Appl. No. 11/405,917, filed Apr. 18, 2006, Dianda et al.

* cited by examiner

*Primary Examiner* — Hassan Kizou
*Assistant Examiner* — Toan D Nguyen

(57) ABSTRACT

Systems and methods of coupling a wireless network to one or more wireless adapters by way of powerlines are provided. A communication device can be employed to couple a wireless macro network to one or more wireless adapters. The communication device can provide quality of service and encryption on a per wireless adapter basis. The communication device can also identify frequencies that experience interference, and are suppressed by a harmonic suppressor, and avoid these frequencies when transmitting communications over the powerlines.

19 Claims, 2 Drawing Sheets

SYSTEMS AND METHOD OF COUPLING A WIRELESS MACRO NETWORK TO A WIRELESS ADAPTER

BACKGROUND OF THE INVENTION

Figure 1:
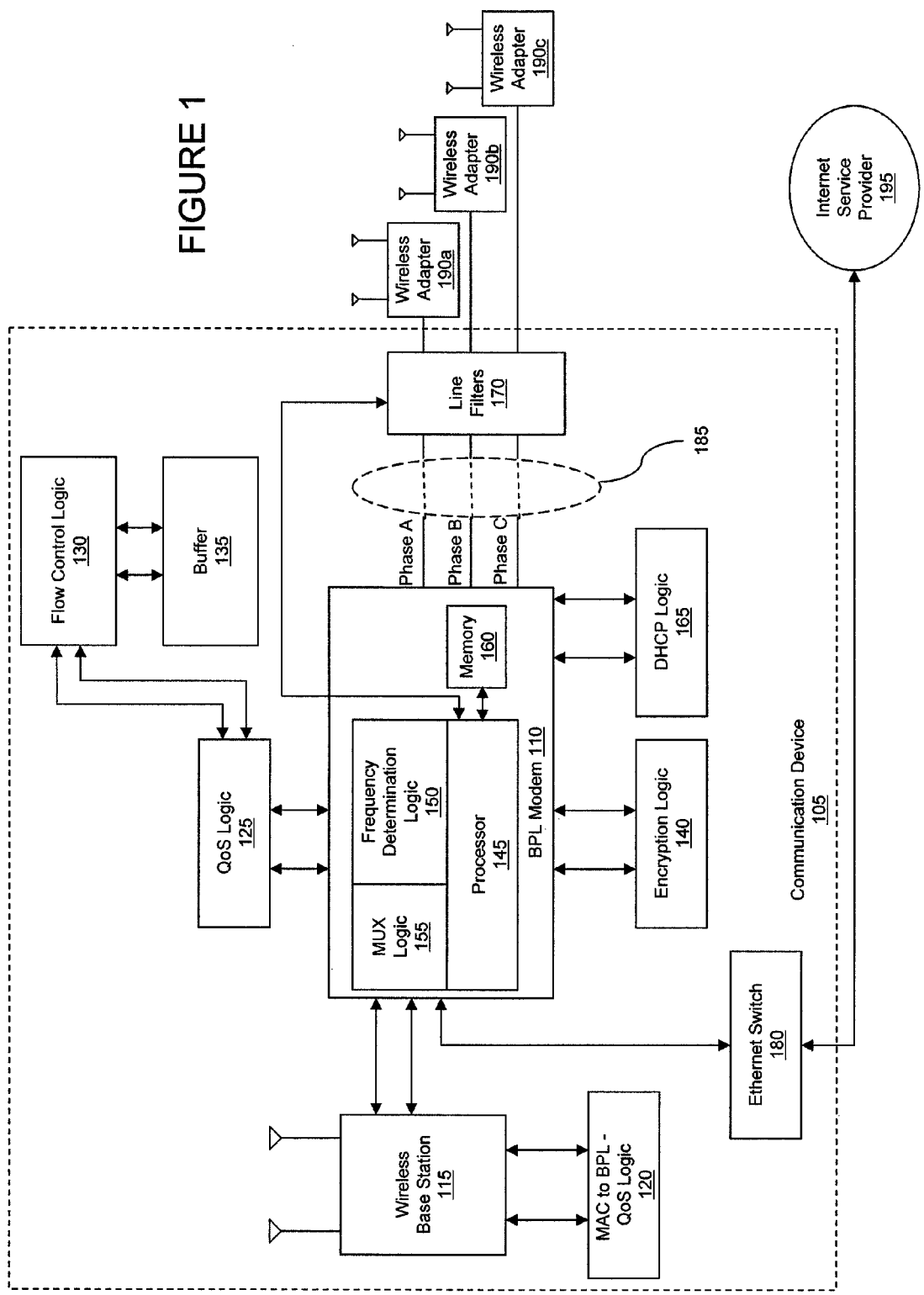

Service providers of wireless communication systems are continuously working on improving the wireless coverage of their respective systems. They employ techniques such as providing more base transceiver stations (BTS) within a given area, providing BTSs in areas not previously covered, and improving the performances of BTS and network equipment to reduce the probability of dropped calls and signal interference due to poor radio frequency (RF) environments.

Among these on-going developments is the improvement of wireless coverage inside buildings, which includes offices, dwellings and other structures. Buildings generally have an adverse effect on the RF environment of a wireless communication system. They may be constructed out of many RF affecting materials, such as grounded steel frames, that interfere with and/or reduce the signal strength of wireless communication signals inside of the building.

Attempts have been made at improving the wireless coverage inside buildings. One of these is to employ a repeater outside of a building and distributed antenna modules strategically placed inside of the building. Another is to employ micro-BTSs that are coupled to a mobile switching center/base station controller (MSC/BSC) or MSC. These systems typically require coaxial or twisted pair cables to be run to the location of each distributed antenna module or micro-BTS.

SUMMARY OF THE INVENTION

One problem with the afore-mentioned techniques for improving wireless coverage within buildings is that not all buildings are wired with coaxial or twisted pair cables and/or not all businesses or persons have the authority or the budget to run these cables throughout a building. Accordingly, the exemplary embodiments of the present invention overcome these and other deficiencies of conventional in-building wireless systems.

Exemplary embodiments provide a communication device that couples a wireless macro network to wireless adapters using powerlines. The communication device includes a wireless base station that receives communications from the wireless macro network and provides the communications to a broadband over powerline modem, which in turn provides the communications to wireless adapters using powerlines. The communication device can provide quality of service for communications on a per wireless adapter basis. Moreover, the communication device can encrypt communications with wireless adapters. Additionally, the communication device can determine frequencies that experience interference on the powerlines, and multiplex signals in such a way to avoid using such frequencies.

Other objects, advantages and novel features of the present invention will become apparent from the following detailed description of the invention when considered in conjunction with the accompanying drawings.

BRIEF DESCRIPTION OF THE DRAWING FIGURES

Figure 2:
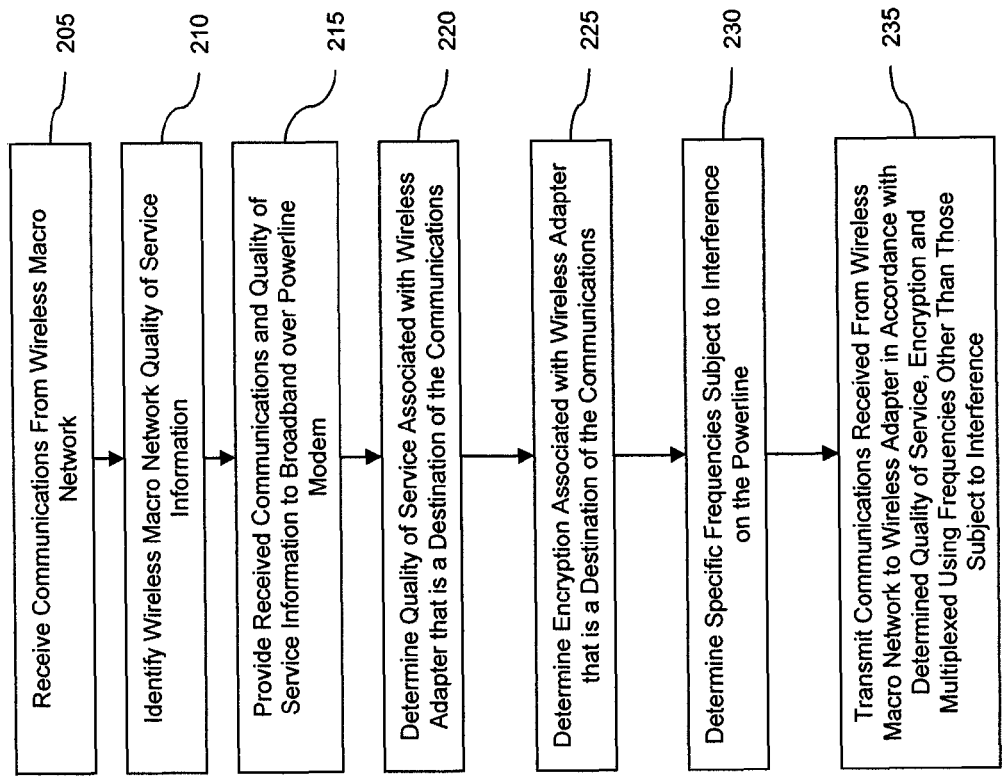

FIG. 1 is a block diagram of an exemplary communication system in accordance with the present invention; and FIG. 2 is a flow diagram of an exemplary method in accordance with the present invention.

DETAILED DESCRIPTION OF THE PREFERRED EMBODIMENTS

FIG. 1 is a block diagram of an exemplary communication system in accordance with the present invention. The system includes a communication device 105 coupled to a plurality of wireless adapters 190a-190c via a three-phase powerline 185. Wireless adapters 190a-190c each provide a wireless coverage area for supporting communications with wireless devices, and each can cover a single floor of a building, part of a single floor, or more than one floor. Wireless adapters 190a-190c can be, for example, WiMAX and/or Wi-Fi-compliant, and can employ multiple-input multiple-output (MIMO) communication techniques. Although FIG. 1 illustrates three wireless adapters, the present invention can include more or less than three wireless adapters.

Communication device 105 includes a broadband over powerline modem 110 that couples wireless base station 115, via three-phase powerline 185, to the plurality of wireless adapters 190a-190c. Wireless base station 115 can, for example, receive WiMAX or CDMA communication signals from a wireless macro network (not illustrated). Communications between wireless base station 115 and a wireless macro network can occur using microwave frequencies, local multipoint distribution service (LMDS) and/or multichannel multipoint distribution server (MMDS). The signals from the wireless macro network can include voice, video and data signals, thereby providing the so-called triple play to wireless adapters 190a-190c. Communication device 105 can also include an Ethernet switch 180, which couples broadband over powerline modem 110 to an Internet Service Provider 195. Dynamic host configuration protocol (DHCP) logic 165 can be employed for allocating IP addresses to wireless base station 115 and wireless adapters 190a-190c.

In accordance with exemplary embodiments of the present invention, quality of service can be provided on a per wireless adapter basis, whereas quality of service is typically provided on a per wireless device basis, such as the wireless devices that communicate using wireless adapters 190a-190c. Accordingly, each of wireless adapters 190a-190c can have a different subscription level, and a corresponding different quality of service level. The quality of service is provided by the present invention using medium access control (MAC) to broadband over powerline (BPL) quality of service (QoS) logic 120, which is coupled to wireless base station 115, and QoS logic 125, flow control logic 130 and buffer 135. Specifically, MAC to BPL QoS logic 120 converts the QoS from the MAC layer used by the wireless macro network (not illustrated) to the IP layer so that the QoS information can be provided to broadband over powerline modem 110. Likewise, when communications are received by wireless base station 115 from broadband over powerline modem 110, logic 120 converts the quality of service information from the IP layer to the MAC layer used by the wireless macro network for quality of service.

When broadband over powerline modem 110 receives communications from wireless base station 115 and quality of service information from logic 120, via base station 115, QoS logic 125 controls the quality of service of the communications using flow control logic 130 and buffer 135. Specifically, based on the quality of service information, flow control logic 130 controls which communications are given priority and transmitted to the wireless adapters, and which communications are temporarily stored in buffer 135.

Exemplary embodiments of the present invention also provide for encryption of communications over powerlines 185. Specifically, broadband over powerline modem 110 uses encryption logic 140 to encrypt communications received from wireless base station 115 for transmission to wireless adapters 190a-190c, and the wireless adapters can decrypt the communications for transmission to wireless communication devices within range of the wireless adapter. This encryption can be, for example, a public-private key encryption, token-based encryption or any other type of encryption scheme. Furthermore, this encryption is in addition to any other encryption that is provided for the communications, such as virtual private network (VPN) encryption or the like. The encryption can be, for example, greater than 152 bit encryption.

Exemplary embodiments of the present invention also determine which frequencies are experiencing interference on the powerlines 185, and multiplex the communications in such a way that they avoid these frequencies. Specifically, communication device 105 includes line filters 170 coupled between broadband over power line modem 110 and wireless adapters 190a-190c. Broadband over powerline modem 110 includes a processor 145 and memory 160, and processor 145 includes frequency determination logic 150 and multiplexing (MUX) logic 155. Processor 145 is coupled to line filters 170, and can measure the noise of the powerlines and adjust the frequencies being filtered by the line filters. Based on these measurements, logic 150 determines which frequencies are experiencing interference on the powerlines (i.e., which frequencies are filtered by line filters 170), and multiplexing logic 155 multiplexes the communications so as to avoid these frequencies.

Broadband over powerline modem 110 can employ orthogonal frequency division multiplexing (OFDM), in which communications are spread across a number of frequencies (also commonly referred to as tones), which may or may not be contiguous. The particular frequencies employed for transmitting communications can be any frequencies available on the powerlines, which is typically between 1 MHz and 10 GHz, and the number of frequencies employed can be dependent upon the bandwidth required for the communications. Although FIG. 1 illustrates line filters 170 being a component of communication device 105, the line filters can be external to the communication device.

Processor 145 can also provide authentication functions for wireless adapters 190a-190c and wireless communication devices that use such adapters. This authentication ensures that only authorized wireless adapters are employed, and that only those wireless communication devices that are authorized to use a particular adapter use such adapter.

The various logic illustrated in FIG. 1 can be implemented in a microprocessor, field programmable gate array (FPGA) and/or an application specific integrated circuit (ASIC). When implemented in a processor, the logic can be processor-executable code loaded from a memory. Although FIG. 1 illustrates various logic as being separate components, the logic can be combined into a single component. For example, logic 125 and 130 can be implemented in processor 145, and buffer 135 can be implemented in memory 160.

FIG. 2 is a flow diagram of an exemplary method in accordance with the present invention. Initially, wireless base station 115 receives communications from a wireless macro network (step 205), and MAC to BPL QoS logic 120 identifies the wireless macro network quality of service information from the MAC layer of the received communications (step 210). The received communications and quality of service information is provided to broadband over powerline modem 110 (step 215). QoS logic 125 determines the quality of service associated with a wireless adapter that is the destination of the communications (step 220), encryption logic 140 determines the encryption information for the selected wireless adapter (step 225), and logic 150 selects frequencies that avoid interference (step 230). Broadband over powerline modem 110 then transmits the communications to a wireless adapter in accordance with determined quality of service and encryption, and multiplexes the communications to avoid those frequencies determined to be subject to interference (step 235). Similar processing occurs for communications received from wireless adapters 190a-190c being sent to the wireless macro network by way of wireless base station 115.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A communication device, comprising:
    a wireless base station;
    a broadband over powerline modem, coupled to the wireless base station and to a powerline, wherein the broadband over powerline modem is coupled to a plurality of wireless adapters via the powerline; and
    logic, coupled to the broadband over powerline modem, that controls quality of service of communications between the wireless base station and a wireless adapter,
    wherein the powerline is a three-phase powerline, and the broadband over powerline modem is coupled to at least two wireless adapters of the plurality of wireless adapters by different phases of the powerline.

2. The communication device of claim 1, wherein the quality of service is based upon a subscription associated with the wireless adapter.

3. The communication device of claim 1, wherein the broadband over powerline modem comprises:
    a memory; and
    a processor coupled to the memory, the processor including
        logic that determines specific frequencies subject to interference on the powerline; and
        logic that multiplexes communications received from the wireless base station onto the powerline based on the determined specific frequencies.

4. The communication device of claim 1, wherein the processor multiplexes communications onto the powerline using orthogonal frequency division multiplexing, and communications are multiplexed onto frequencies other than the determined specific frequencies.

5. The communication device of claim 1, wherein the wireless base station, the broadband over powerline modem, and the logic arranged to control quality of service are included within a single housing.

6. The communication device of claim 1, further comprising:
    flow control logic, coupled to the logic arranged to control quality of service; and
    a buffer coupled to the flow control logic,
    wherein the logic arranged to control quality of service operates in conjunction with the flow control logic and the buffer to control quality of service.

7. The communication device of claim 1, further comprising:

encryption logic, coupled to the broadband over powerline modem, that encrypts communications received from the wireless base station for delivery to the wireless adapter.

8. The communication device of claim 1, further comprising:
logic, coupled to the wireless base station, that identifies a quality of service of communications received from the wireless base station, and provides the identification to the broadband over powerline modem.

9. The communication device of claim 1, further comprising:
an Ethernet switch, coupled to the broadband over powerline modem and to an internet service provider.

10. The communication device of claim 1, wherein a communication link coupling the wireless base station and a wireless macro network comprises a wireless communication link using at least one of code division multiple access and orthogonal frequency division multiple access communication techniques.

11. The communication device of claim 10, wherein, if the communication link comprises orthogonal frequency division multiple access communication techniques, such technique is compliant with the WiMAX standard.

12. The communication device of claim 1, wherein the wireless adapters communicate with wireless devices using Wi-Fi or WiMAX protocols.

13. A method, comprising the acts of:
receiving communications from a wireless macro network;
providing the communications to a broadband over powerline modem;
determining a wireless adapter of a plurality of wireless adapters coupled to the broadband over powerline modem that is to receive the communications;
determining a quality of service associated with the wireless adapter of the plurality of wireless adapters; and
forwarding the communications to the wireless adapter of the plurality of wireless adapters via a powerline in accordance with the determined quality of service,
wherein the powerline is a three-phase powerline, and the broadband over powerline modem is coupled to at least two wireless adapters of the plurality of wireless adapters by different phases of the powerline.

14. The method of claim 13, further comprising the acts of:
encrypting the received communications, wherein the communications forwarded to the wireless adapter are encrypted.

15. The method of claim 13, further comprising the acts of:
performing flow control of the communications based on the determined quality of service.

16. The method of claim 15, wherein the act of performing flow control includes buffering the communications based on the determined quality of service.

17. The method of claim 13, further comprising the acts of:
determining specific frequencies subject to interference on the powerline; and
multiplexing the received communications onto the powerline based on the determined specific frequencies.

18. The method of claim 17, wherein the communications are multiplexed onto the powerline using orthogonal frequency division multiplexing, and communications are multiplexed onto frequencies other than the determined specific frequencies.

19. The method of claim 17, wherein a line filter is controlled to filter the determined specific frequencies on the powerline.

* * * * *